(12) United States Patent
Vyas

(10) Patent No.: US 10,406,448 B2
(45) Date of Patent: Sep. 10, 2019

(54) SOFT ROBOT SYSTEM AND METHOD

(71) Applicant: Universal City Studios LLC, Universal City, CA (US)

(72) Inventor: Anisha Vyas, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 15/934,264

(22) Filed: Mar. 23, 2018

(65) Prior Publication Data

US 2018/0272239 A1 Sep. 27, 2018

Related U.S. Application Data

(60) Provisional application No. 62/476,756, filed on Mar. 25, 2017.

(51) Int. Cl.
*A63G 31/12* (2006.01)
*B25J 9/14* (2006.01)
*A63H 3/00* (2006.01)

(52) U.S. Cl.
CPC .............. *A63G 31/12* (2013.01); *B25J 9/142* (2013.01)

(58) Field of Classification Search
CPC ........ A63G 31/00; A63G 31/12; A63G 25/00; A63H 3/00; A63H 3/06; F61D 31/00; F61D 31/02
USPC .................................. 472/134; 446/220–226
See application file for complete search history.

(56) References Cited

U.S. PATENT DOCUMENTS

| | | | |
|---|---|---|---|
| 6,220,965 B1 * | 4/2001 | Hanna | A63G 7/00 463/52 |
| 6,447,361 B1 * | 9/2002 | Akiyama | A63H 27/10 137/625.21 |
| 6,676,530 B2 | 1/2004 | Lochtefeld | |
| 2004/0116039 A1 * | 6/2004 | Mueller | A63H 27/10 446/220 |
| 2014/0270906 A1 | 9/2014 | Jackson | |

FOREIGN PATENT DOCUMENTS

WO  2016167851  10/2016

OTHER PUBLICATIONS

PCT/US2018/024105 Search Report and Written Opinion dated Jul. 11, 2018.

* cited by examiner

*Primary Examiner* — Kien T Nguyen
(74) *Attorney, Agent, or Firm* — Fletcher Yoder P.C.

(57) ABSTRACT

An amusement park attraction includes an attraction feature. The attraction feature includes a fluid actuator having an inflatable mass, the inflatable mass being fluidly connected to a source of pressurized fluid to enable inflation of the inflatable mass. Fluid control devices are configured to adjust inflation of the inflatable mass, and sensors are configured to monitor state properties of the fluid actuator. A controller is communicatively coupled to the fluid control devices and the sensors. The controller is configured to controllably inflate the inflatable mass based at least on feedback from the sensors to cause the fluid actuator to impact an object. The controller is configured to control the inflation of the inflatable mass to adjust parameters of the fluid actuator to maintain a force exerted by the fluid actuator on the object to within a predetermined range.

20 Claims, 4 Drawing Sheets

SOFT ROBOT SYSTEM AND METHOD

CROSS REFERENCE TO RELATED APPLICATION

This application claims priority to and benefit of U.S. Provisional Patent Application No. 62/476,756, entitled "Soft Robot System and Method for Interacting with a Human," filed Mar. 25, 2017, which is herein incorporated by reference in its entirety for all purposes.

BACKGROUND

The subject matter disclosed herein relates generally to the field of amusement parks. More specifically, embodiments of the present disclosure relate to systems and methods utilized to provide amusement park experiences with interactive equipment.

Various amusement rides and exhibits have been created to provide users with unique interactive, motion, and visual experiences. In various rides and exhibits, the user experience may be enhanced by employing certain interactive components within the rides and exhibits. However, various mechanical devices that actuate these interactive components may often appear to move in a linear, more mechanical, or pre-programmed nature that leaves the user with the impression of interacting with a robot, as opposed to a more life-like object. In addition, traditional interactive components are often limited in regard to touching or interacting with itself or other objects due to mechanical forces (e.g., from collisions) that could result from such interactions. It is now recognized that it may be desirable to provide interactive components that render more life-like and dynamic interactive experiences.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, an amusement park attraction includes an attraction feature. The attraction feature includes a fluid actuator having an inflatable mass, the inflatable mass being fluidly connected to a source of pressurized fluid to enable inflation of the inflatable mass. One or more fluid control devices are configured to adjust inflation of the inflatable mass, and one or more sensors are configured to monitor state properties of the fluid actuator. A controller is communicatively coupled to the one or more fluid control devices and the one or more sensors. The controller is configured to controllably inflate the inflatable mass based at least on feedback from the one or more sensors to cause the fluid actuator to impact an object, and the controller is configured to control the inflation of the inflatable mass to adjust one or more parameters of the fluid actuator to maintain a force exerted by the fluid actuator on the object to within a predetermined range.

In another embodiment, a method of operating an attraction feature of an amusement park includes inflating a fluid actuator of an attraction feature to move the attraction feature along a motion profile to cause an interaction between the attraction feature and a target. The interaction includes physical contact between the attraction feature and the target. The method also includes collecting information relating to the interaction between the attraction feature and the target using one or more sensors as the interaction is occurring, and analyzing, via a controller in communication with the one or more sensors, the collected information from the one or more sensors to determine an interaction parameter associated with the interaction. The method further includes adjusting inflation of the fluid actuator as the interaction is occurring to maintain the interaction parameter within a target range.

In another embodiment, a pneumatic robotic system includes an attraction feature having a plurality of fluid actuators configured to provide a shape and a motion profile of the attraction feature in response to controlled inflation. A fluid source is fluidly coupled to the attraction feature and is configured to provide pressurized fluid to the plurality of fluid actuators. One or more fluid control devices of the pneumatic robotic system are configured to control pressurized fluid flow from the fluid source to the plurality of fluid actuators, and one or more sensors associated with the attraction feature are configured to monitor state properties of the plurality of fluid actuators. A controller is communicatively coupled to the one or more fluid control devices and to the one or more sensors. The controller is configured to analyze feedback from the one or more sensors relating to an interaction between the attraction feature and a target as the interaction is occurring to determine one or more interaction parameters associated with the interaction, wherein the interaction between the attraction feature and the target includes physical contact between the attraction feature and the target. The controller is also configured to adjust inflation of at least one of the plurality of fluid actuators to maintain the one or more interaction parameters within a predetermined range as the interaction is occurring.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

With the foregoing in mind, pneumatic robotic technology may be employed to create mechanical devices that move in a more fluid and life-like manner that enhance the user experience in various interactive and visual experiences. Moreover, pneumatic robotic technology provides the ability for humans (e.g., guests) to interact with animate characters or attraction features (e.g., machines, robots) in a comfortable and interactive fashion since they achieve their shapes and movements by directing fluid (e.g., gas and/or liquid) through a collapsible or inflatable material (e.g., housing). Thus, such robots may be referred to as "soft robots." As used herein, pneumatic robotic technology (e.g., pneumatic robots) may include balloon-like or inflatable attraction features that receive fluid to form a discernable shape. Such features are often referred to as "actuators" of the robot, as they are responsible for at least a portion of the robot's movement. In addition, pneumatic robotic technology may include fluid-directing mechanisms (e.g., pumps, valves, cavities, or a combination thereof) within and/or fluidly coupled to the inflatable attraction features that may adjust to cause the inflatable attraction features to move in certain directions or patterns (e.g., along motion paths). In this way, pneumatic robotic technology may be used to form various shapes, bodies, structures, and other formations. In addition, the ability to controllably inflate the attraction features or pneumatic robots means that it is possible to control the compliance of the outer surfaces of the attraction features to maintain a certain level of interactions between the attraction features and a human guest (e.g., a comfortable interaction).

Figure 1:
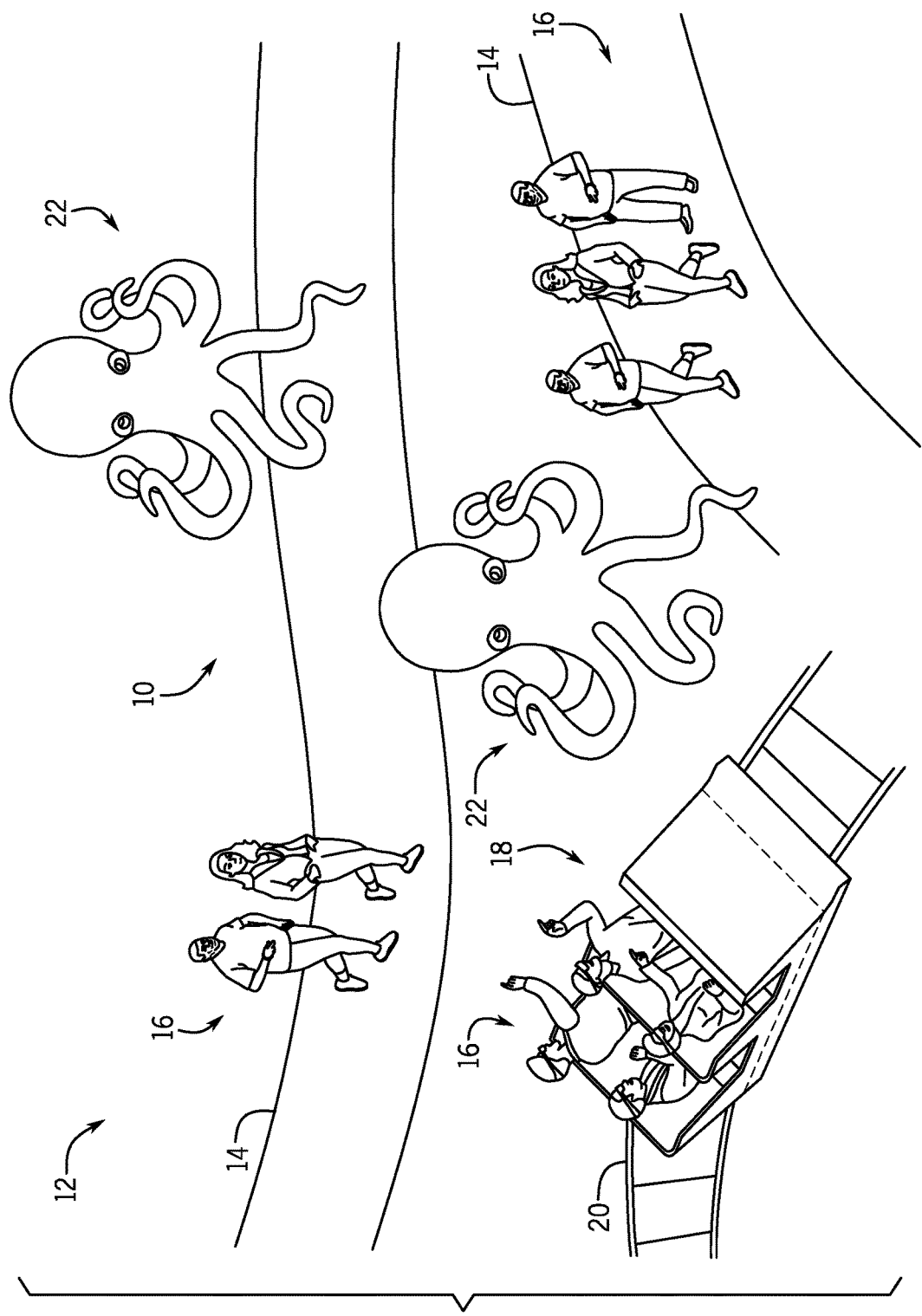
FIG. 1 is a perspective view of an embodiment of a pneumatic robotic system that enhances experiences of guests in an amusement park, in accordance with present embodiments.

While present embodiments may be implemented in a variety of settings, an example setting in which a pneumatic robotic system 10 is used in an amusement park 12 is shown schematically in FIG. 1. As illustrated, the amusement park 12 may include walkways 14 for guests 16 of the amusement park 12, themed attractions, and other amusement park attractions, such as a ride 18 (e.g., including a ride vehicle configured to hold passengers). The ride 18 may be configured to accommodate the guests 16 of the amusement park 12 and travel along a vehicle path 20. The pneumatic robotic system 10 may include one or more attraction features 22 (e.g., pneumatic robots, machines) that may be configured to interact with objects (e.g., the guests 16, portions of the ride vehicle, other amusement park characters, props, and so forth) to enhance the experiences of the guests 16. For example, as the guest 16 walks along the walkways 14, the one or more attraction features 22 may move to appear life-like and/or may touch the guest 16 to provide spontaneous life-like interaction with the guest 16. In certain embodiments, the one or more attraction features 22 may interact with the guests 16 on the ride 18. In certain embodiments, the one or more attraction features 22 may interact with one another or with any other suitable objects in the amusement park 12.

Figure 2:
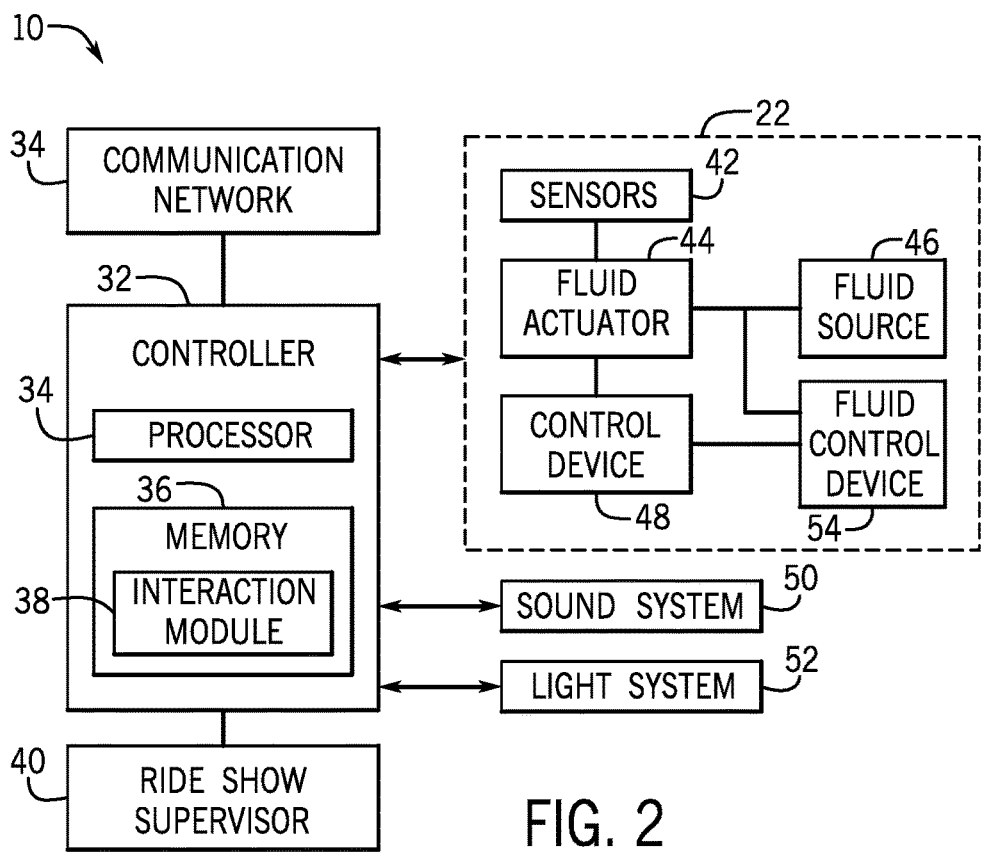
FIG. 2 is a block diagram of an embodiment of the pneumatic robotic system of FIG. 1, in accordance with present embodiments.

FIG. 2 is a block diagram of various components of the pneumatic robotic system 10. In the illustrated embodiment, the pneumatic robotic system 10 may include a communication network 30 (e.g., wired and/or wireless communication network, such as WLAN, WWAN, and NFC), a controller 32, and the attraction feature 22. The communication network 30 may communicatively couple various components of the pneumatic robotic system 10 to one another and/or communicatively couple the pneumatic robotic system 10 to other systems of the amusement park 12 (e.g., a cloud, a data server, the ride 18, ride show supervisor). The controller 32 may include a processor 34 (e.g., a general-purpose processor, a system-on-chip (SoC) device, an application-specific integrated circuit (ASIC), or some other similar processor configuration) operatively coupled to a memory 36 (e.g., a tangible non-transitory computer-readable medium and/or other storage device) to execute instructions for operating the attraction feature 22. The memory 36 may store an interaction module 38 configured to analyze and/or determine interactions of the pneumatic robotic system 10 with the guest(s) 16. In certain embodiments, the controller 32 may be communicatively coupled (e.g., via the communication network 30) to a ride show supervisor 40 to coordinate the operations of the attraction feature 22 with operations of the other amusement park attractions, such as the ride 18 and a show effect system (e.g., projection and/or display devices, lighting systems, sound systems, and so forth to provide show effects to the guests 16). In accordance with present embodiments, the ride show supervisor 40 may include corresponding processors (e.g., a general-purpose processor, a system-on-chip (SoC) device, an application-specific integrated circuit (ASIC), or some other similar processor configuration) and memory (e.g., a tangible non-transitory computer-readable medium and/or other storage device) to execute instructions configured to coordinate operation of the attraction feature 22 with other portions of the attraction. While illustrated as separate features in this embodiment, in other embodiments, all or a portion of the controller 32 and the ride show supervisor 40 may be implemented on the same piece of hardware or equipment, and/or may include similar or the same programming (e.g., for redundancy).

The attraction feature 22 may include or be associated with one or more sensors 42, a fluid actuator 44, a fluid source 46, a control device 48 (e.g., a programmable logic controller (PLC)), a sound system 50, and a light system 52. The one or more sensors 42 may include one or more force sensors, pressure sensors, cameras, fluid property sensors, temperature sensors, or a combination thereof, disposed on various suitable locations of the attraction feature 22. The one or more sensors 42 may be disposed on an outer surface and/or an inner surface of the attraction feature 22. The one or more sensors 42 may be configured to collect information related to the motion and/or interaction of the attraction feature 22 with object(s) or human(s).

The fluid actuator 44 may be fluidly coupled to the fluid source 46, and includes one or more inflatable features (e.g., one or more inflatable masses) whose shape and motion is able to be controlled by varying the internal fluid pressure of the feature. Such inflatable masses may include balloon-like materials having elastic properties (e.g., elastomers), or may include more rigid materials having a predefined shape when a threshold inflation pressure is reached (e.g., the rigid material does not stretch by an appreciable amount). As an example, such materials may include synthetic fabrics (e.g., polyamide fabrics, polyaramide fabrics, polyester fabrics), silk, canvas, and so forth.

The fluid actuator 44 may include, or be coupled to any suitable fluid directing mechanisms (e.g., fluid control devices 54), including suitable pumps, valves, pipes, conduits, etc., to change or maintain a motion profile (e.g., including the motion path and/or movement speed) of the fluid actuator 44. Such fluid control devices 54 may, additionally or alternatively, be a part of or fluidly coupled to the fluid source 46. In certain embodiments, the fluid source 46 may be a pressurized fluid source. In accordance with present embodiments, the fluid control devices 54 may allow inflation and deflation of the fluid actuators 44. For instance, the fluid control devices 54 may be configured to allow fluid to flow into the fluid actuators 44, and out of the fluid actuators 44. Certain embodiments of the attraction feature may include fluid control devices 54 that allow fluid to flow between individual fluid actuators 44.

The fluid may be directed to any suitable portions within the attraction feature 22 to change or maintain the shape and the motion profile of the attraction feature 22. That is, a pattern of the fluid actuators 44 of the attraction feature 22 governs the overall shape of the attraction feature 22. In this way, adjusting inflation of the fluid actuators 44 changes the shape of the attraction feature 22 and, in certain embodiments, movement of the attraction feature 22. The control device 48 (e.g., with its own pre-programmed motion profile), as noted above, may include a programmable logic controller (PLC), or other suitable control devices, to control the operations of the fluid actuator 44, the fluid source 46, and so forth. For example, the control device 48 may receive instructions from the controller 32, and based on the instructions, the control device 48 may control the operations of the fluid actuator 44 (the fluid control devices 54) according to a pre-programmed motion profile (or according to a motion profile defined or modified by the interaction module 38 or other stored instruction set of the controller 32) to actuate the attraction feature 22. Indeed, in certain embodiments, the controller 32 and/or the control device 48 may implement all or a part of an animation playback system, where the controller 32 and/or the control device 48 cause the attraction feature 22 to move according to a pre-programmed set of motion paths. This animation playback system may accordingly include a plurality of stored motion profiles for the fluid actuators 44 of the attraction feature 22, and any one or a combination of these stored motion profiles may be modified to maintain a certain level of interaction (e.g., maintain a force imparted from the fluid actuators 44 to an object) to within a certain predetermined range. Further, while illustrated as separate features in this embodiment, in other embodiments, all or a portion of the control device 48, the controller 32, the ride show supervisor 40, or any combination thereof, may be implemented on the same piece of hardware or equipment, and/or may include shared, overlapping, similar, or the same programming (e.g., for redundancy).

The sound system 50 may include one or more audio transducers. For instance, the sound system 50 may include microphones, speakers, speaker amplifiers, audio playback devices, or other suitable audio devices. The light system 52 may include one or more lighting or lighting effect devices (e.g., controlled via a standard protocol, such as Digital Multiplex (DMX)). Operation of these systems may be controlled using the controller 32. For instance, the controller 32 may control the operations of the sound system 50 and the light system 52 to coordinate the sound and/or light effects with the motion profile of the attraction feature 22. The various components of the attraction feature 22 may be communicatively coupled to one another and/or coupled to the controller 32 directly, or via the communication network 30. The controller 32 may control the motion profile of the attraction feature 22 to interact with (e.g., touch) one or more targets (e.g., the guests 16, the attraction feature 22 itself, or any other suitable objects). The controller 32 may analyze the information related to the interaction (e.g., information collected by the one or more sensors 42) and the motion profile of the attraction feature 22 in-situ to determine and/or change the motion profile upon interaction with the one or more targets.

Figure 3:
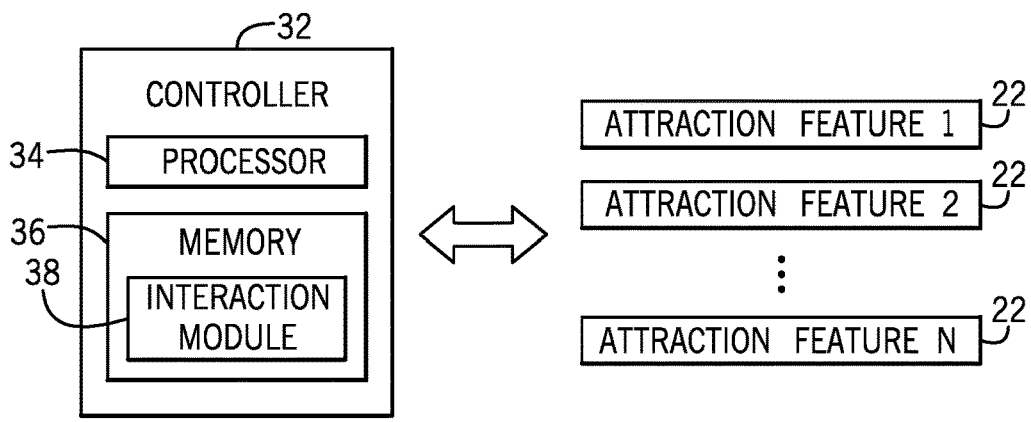
FIG. 3 is a block diagram of another embodiment of the pneumatic robotic system of FIG. 1, in accordance with present embodiments.

In some embodiments, as illustrated in FIG. 3, the controller 32 may be communicatively coupled to multiple attraction features 22. The controller 32 may control the operations of the multiple attraction features 22 to change and/or maintain the motion profiles of the multiple attraction features 22. The controller 32 may control the operations of the multiple attraction features 22 to interact with one another and/or with one or more targets. It should be noted that in cases that multiple attraction features 22 are interacting with a target (e.g., the guest 16, a suitable object, an attraction feature), the controller 32 may coordinate and/or control the interactions based on a net interaction parameter (e.g., net force, net pressure, net momentum) resultant from all of the attraction features 22 in physical contact with the target. For example, the controller 32 may change motion profiles of the multiple attraction features 22 to maintain a net interaction parameter at a desirable level (e.g., with in a desirable range).

In certain embodiments of the present disclosure, the pneumatic robotic system 10 may be employed to allow the one or more attraction features 22 to touch other attraction features 22, interact with (e.g., touch) different parts of its own structure, surroundings objects (e.g., ride and show equipment), and the like. The pneumatic robotic system 10 may perform controlled, repeated movements, which may result in impacts (e.g., intentional and unintentional) while maintaining a controlled net mechanical force delivered to a target below a particular level (e.g., a level that allows interaction without damaging the integrity of the respective structure or parts). Additionally, unlike traditional animated features that are often prevented from interacting with human users (e.g., to avoid the potential for collisions and/or a variety of failure modes), the attraction features 22 (e.g., pneumatic robots) according to the present disclosure can be designed and controlled to operate using a predefined range of force when interacting with human users (e.g., the guests 16), thereby enhancing guest experiences. As an example, in one embodiment, the attraction feature 22 may be controlled to dynamically change an impact force imparted to a human (the guest 16 of the amusement park 12).

In accordance with present embodiments, the attraction feature 22 may be configured to allow the guest 16 to interact with the attraction feature 22 and affect the motion profile (e.g., including the motion path and/or movement speed) of the fluid actuator 44. In a failed state of the motion profile, it may be desirable for the fluid actuator 44 to be compliant to the guest 16 at impact to ensure the comfort (or different sensation) of the guest 16. For example, the controller 32 may send instructions to the control device 48, which in turn controls inflation or deflation of the fluid actuator 44 (e.g., a certain portion of the fluid actuator 44).

In certain embodiments, and by way of non-limiting example, the pneumatic robotic system 10 may include one or more attraction features 22 that each includes an inflatable mass (a corresponding one or more fluid actuators 44) that, upon inflation, forms a predefined shape to produce an animated figure or motion profile of an animated figure. For example, a plurality of the fluid actuators 44 of each of the attraction features 22 may correspond to an animated figure shape and/or animated figure motion profile. As an example, a first set of fluid actuators 44 may be used to form a shape corresponding to the animated figure, while a second set of fluid actuators 44 (which may include the same, different, or a shared subset of fluid actuators compared to the first set) may be used for movement of the animated figure along a particular motion profile. In this way, controlled inflation of first fluid actuators 44 may control the structural integrity of the animated figure, while controlled inflation of second fluid actuators may control the motion profile of the animated figure. Either or both strategies may be employed to control interactions between the attraction feature 22 and the guest 16 or other target feature.

As an example of controlled inflation (which is also intended to denote controlled deflation where appropriate), each of the one or more attraction features 22 includes one or more corresponding fluid control devices 54 that controls the pressurized fluid introduced from the fluid source 46 to inflate or deflate portions of the attraction feature 22. The fluid control devices 54 may include one or more valves and/or pumps that are controlled via the control device 48 to inflate or deflate fluid actuators 44 to a defined pressure and at a controlled rate. To provide for control of the inflation or deflation, and ultimately control over the attraction feature's 22 interaction with a human, each of the one or more attraction features 22 may be communicatively coupled to the controller 32. The controller 32 is communicatively coupled to the respective control device 48 (e.g., a PLC) for each attraction feature 22, and in certain embodiments to the one or more sensors 42 used to monitor the state of the attraction feature 22 in a continuous, real-time manner. As an example, the pressure of the fluid actuators 44 of the attraction features 22 may be monitored using the one or more sensors 42 including one or more pressure sensors positioned at predetermined locations on or within the one or more fluid actuators 44. As another example, the one or more fluid actuators 44 may be monitored using the one or more cameras utilized as the sensors 42, where the cameras are used in conjunction with an associated computing device with machine vision programming. As a further example, a dynamic signal to noise ratio tracking system may have a camera system, a suitably programmed tracking computer system, and associated emitters and/or detectors to employ reflective monitoring techniques. Additionally or alternatively, a camera system and suitably programmed monitoring computer system may employ surface mapping-based monitoring techniques.

A controller (e.g., the controller 32) associated with machine vision implementations may perform real-time monitoring of the outer surfaces of the one or more attraction features 22, and may use such monitoring to provide inputs to algorithmic structures (e.g., a system of equations such as a model associated with the interaction module 38) programmed on the controller 32. Likewise, the controller 32 associated with one or more sensors 42 (e.g., pressure sensors or other fluid property sensors) may perform real-time monitoring of various pressures of the one or more attraction features 22 and may use one or more of the monitored pressures as an input to the algorithms. That is, the presently disclosed pneumatic robotic system 10 performs active monitoring and adjustment of the one or more attraction features 22 to enable controlled physical interactions with a human (e.g., the guest 16).

In accordance with present embodiments, the controller 32 as disclosed herein may represent a master controller or control system communicatively coupled to a controller (e.g., the control device 48 associated with each attraction feature 22), or may represent the specific controller that is associated with each attraction feature 22. As an example, the amusement park 12 may include a master control system (e.g., the controller 32) and each fluid actuator 44 may be controlled by an individual controller (e.g., the control device 48) with its own pre-programmed motion profile.

The controller (e.g., the controller 32) of the present disclosure may perform the active monitoring and adjustment of the fluid actuators 44 of the one or more attraction features 22. As an example, the controller 32 may include specially-programmed hardware and/or software components that monitor state properties of the one or more fluid actuators 44, and use such monitored properties as inputs to a system of equations (e.g., one or more models of the interaction module 38) relating to the interactions between the one or more attraction features 22, the one or more guests 16, and/or other object(s) or machine(s). The controller 32 may continuously perform calculations to determine the extent to which certain variables associated with each of the fluid actuators 44 should be manipulated to maintain the impact force of the one or more attraction features 22 on the guest 16 to within a predetermined range. In certain embodiments, certain thresholds or predetermined ranges associated with the maximum allowable impact force (or other object parameter) may not be a set value for all positions of a fluid actuator along its motion path. Rather, the threshold or predetermined range for the maximum allowable force may be a function of the motion path of the fluid actuator 44 (or the motion path of the overall attraction feature 22). For example, the controller 32 may model the maximum allowable impact force for a given fluid actuator 44 (or the whole attraction feature 44) as a function of a position of the fluid actuator 44 (or the whole attraction feature 44) along the motion path. In this way, the controller 32 may determine a first allowable impact force (e.g., a predetermined range) when the fluid actuator 44 is at a first position along the motion path. However, the controller 32 may determine a second allowable impact force that is different from the first (e.g., a different predetermined range) when the fluid actuator 44 is at a second position along the motion path.

The system of equations used for such determinations may include monitored variables, as well as variables that are fixed based on the materials of the one or more attraction features 22. In accordance with certain embodiments, the controller 32 may account for a number of properties relating to the one or more attraction features 22, such as object dynamic properties (which are initially determined based on an ideal motion profile as discussed below), set object material properties (which depend on the materials of the attraction feature fluid actuators 44), and object compliant properties, which are properties that can be manipulated for calculation of force and real time adjustment.

The controller 32 may utilize one or more mathematical functions to calculate (e.g., via one or more models) a maximum (e.g., worst-case) impact force imparted to the guest 16 by the attraction feature 22 (e.g., one or more of the fluid actuators 44), and may use any one or a combination of monitored and fixed properties as inputs to the function or functions. The controller 32 may also manipulate one or more variables associated with the attraction feature 22 to dynamically control the maximum impact force. More specifically, the controller 32 monitors various aspects (e.g., an internal fluid pressure) associated with the each of the one or more fluid actuators 44 and, based on this real-time monitoring, in combination with various other inputs (e.g., to one or more functions of the system), performs a real-time calculation of the maximum or "worst-case" impact force or force range (e.g., as a function of position along a given motion path). Based on the real-time output of this force (or force range), object compliant properties associated with one or more of the fluid actuators 44 can be adjusted to allow for an increase or decrease of the force. As one example, the controller 32 may first decrease the internal pressure of the one or more of the fluid actuators 44 until reaching the minimum structural pressure requirements (e.g., to maintain a shape of an animated figure) and then decrease velocity and acceleration associated with the motion profile of the attraction feature 22.

In certain embodiments, the controller 32 may calculate a value for F(o), defined herein as the force exerted on a human (e.g., the amusement park guest 16) by an object (the fluid actuator 44). Several objects (e.g., the fluid actuators 44 of the attraction feature 22, the guest 16) may form a system modeled by the controller 32. The controller 32 may calculate/estimate the force exerted based on one or more assumptions relating to the modeled system. For example, the controller 32 may assume that the maximum force exerted by the one or more fluid actuators 44 on the guest 16 is proportional to the momentum of the objects involved in the contact and the natural frequency of the objects. In addition, the controller 32 may assume that at the point of impact, the unsprung mass of the fluid actuators 44 decreases during impact, which will decrease the maximum impact force.

In calculating F(o), the controller 32 may account for object dynamic properties of the fluid actuators 44 of the attraction feature 22, which result from an "ideal" motion profile of the attraction feature 22 that is designed to have a desired effect (e.g., a desired movement path and desired timing for this movement). Based on the ideal motion profile, it is known what the desired coordinate (e.g., X, Y, and Z) positions should be for the fluid actuators 44 at all times. The velocity over time, displacement over time, acceleration over time, or any combination thereof, of the fluid actuators 44 can be set according to the desired positions and timing, depending on the manner in which the equipment is intended to function (e.g., the desired effect of the fluid actuators 44). As one example, the ideal motion profile may be established in the controller 32 during a pre-programming phase to set a baseline regarding how the equipment is designed to function. The controller 32 may use this baseline to calculate initial values for F(o). Object dynamic properties may include, by way of example, $X(t)$=displacement as a function of time, $V(x,t)$=velocity as a function of position and time, $A(x,t)$=acceleration as a function of position and time, $P(o)$=external/atmospheric outside pressure, surface area, assumed maximum (e.g., worst case) contact stiffness, the density of the fluid used for inflation (which may be a set value or may be adjusted if there is more than one source of inflation fluid), or any derivative or integral function thereof, or any combination thereof.

The controller 32 may also account for set object material properties, either directly as a constant input value or as a factor contributing to a variable used in calculating/estimating F(o). That is, the controller 32 may account for the material of the fluid actuators 44 that will ultimately contact the human. Such set object material properties may include $E(m)$=Young's Modulus of the material, as well as the tear strength of the material.

The controller 32 may manipulate certain variables in the system to affect the maximum force (the worst-case impact force) exerted on the guest 16 or other object (e.g., machine). For example, the controller 32 may manipulate the object compliant properties of the fluid actuators 44, which are properties to be manipulated for calculation of F(max) and real-time adjustments to the system based on F(max). As discussed herein, F(max) may be defined as being the product of the velocity at impact, multiplied by the square root of the product of the total mass at contact and the contact stiffness of the contacting surfaces, as set forth in the following equation:

$$F(\max) = V(\text{impact}) * \sqrt{M(\text{total}) * \text{ContactStiffness}}. \quad (1)$$

It is presently recognized that of the factors noted above in Equation (1), V(impact) and M(total) are variables that can be manipulated to affect F(max). With typical machinery, M(total) may not be considered a variable that can be manipulated. More specifically, the mass of the contacting objects is not typically subject to change. However, in accordance with present embodiments, it may be possible to adjust the contact mass by adjusting pressures associated with the fluid actuators 44.

Thus, in accordance with certain embodiments, the controller 32 may manipulate the contact mass proportionally relative to the calculated F(max) and/or desired F(max) by manipulating pressure associated with the fluid actuators 44. For example, the controller 32 may manipulate ΔP, which is the pressure difference across the object (the fluid actuator 44) and/or P(i), which is the average internal object pressure.

In certain embodiments, the controller 32 may also perform sub-calculations relating to the mass of the object (e.g., the fluid actuator 44), M(o), which, as noted above, is a component of the total mass (M(total)) during contact (the contact mass). Such sub-calculations may be performed as part of a larger series of calculations relating to determining F(max). For example, with a compliant object, such as the attraction feature 22, the fluid (e.g., unsprung mass) actuated by the fluid actuator 44 decreases during an impact. The unsprung mass decrease may be a sub-calculation performed by the controller 32. Another calculation (e.g., sub-calculation) performed by the controller 32 relating to the object (e.g., the fluid actuator 44) mass may include the object mass moment of inertia, which relates to the distribution of the mass of the object (e.g., relative to a particular direction or axis).

While the controller 32 may make pressure adjustments to the fluid actuators 44, the controller 32 may limit such pressure adjustments based on certain considerations. For example, the controller 32 may account for a minimum pressure required for structural integrity of the attraction feature 22 by bounding the maximum pressure change with the minimum pressure (e.g., required for maintenance of motion profile and structural integrity of the attraction feature 22). That is, the controller 32 may make changes to the pressure of the fluid actuator 44 while still enabling the fluid actuator 44 to maintain sufficient internal fluid pressure required for structural integrity.

As set forth above with respect to equation (1), F(max) may depend on the velocity at impact (V(impact)), the total contact mass, and the contact stiffness. Thus, in addition to or in lieu of adjusting the total contact mass at impact, the controller 32 may adjust V(impact) to control F(max). Because the velocity at impact relates to the motion profile of the attraction feature 22, the controller 32 may directly adjust the velocity of the attraction feature 22 to adjust the calculated/estimated F(max), or may adjust other aspects of the motion profile of the attraction feature 22 to adjust the calculated/estimated F(max). However, it may be desirable to only adjust certain portions of the motion profile so that the attraction feature 22 still performs its overall intended function (e.g., an animated figure still performs its desired effect).

As a simple example of one fluid actuator 44, the fluid actuator 44 may move from a resting state (velocity is essentially 0) to a final velocity over a certain time period in which the at least a portion of the fluid actuator 44 covers a certain distance (the fluid actuator 44 having V(x,t)). In other words, the motion profile has an acceleration component and a velocity component at impact (A(impact)) and V(impact)). The calculated velocity of the fluid actuator 44 may be V(x,t), and V(impact) may be controlled by the controller 32 to represent a reduction from V(x,t) by adjusting acceleration over the motion profile. For example, the controller 32 may adjust the inflation rate of the fluid actuator 44 (e.g., by controlling the rate at which fluid is allowed to move from the fluid source 46 to the corresponding fluid actuator 44) to adjust V(impact). In adjusting velocity, the controller 32 may also inherently manipulate acceleration and position (at a given time). Any integral or derivative of functions relating to velocity, acceleration, and displacement may be used for calculations and manipulations. In other words, the controller 32 may manipulate the motion profile of the fluid actuator 44. For example, the controller 32 may manipulate velocity over time (increase or decrease velocity in real-time) to continuously calculate what the impact force would be on the guest 16, and may perform further manipulations as appropriate.

The fluid actuator 44 (or attraction feature 22) may have no joints, or may have one or more joints resulting in a certain number of degrees of freedom. In such embodiments, the equation for the total force of the system (F(total)), which is a function of F(o), changes based on the number of joints and degrees of freedom of movement of the fluid actuator 44, as well as how the joints are connected together. In other words, F(total) may also be a function of the number of joints (N), the total degrees of freedom D(N), and other factors. Because the manner in which these joints are connected may change the overall surface area and the tension over the surface area, the controller 32 may integrate the rate of indentation over the total surface area of the fluid actuator 44 in determining F(total).

The controller 32 may manipulate aspects of the fluid actuator 44 relating to its motion profile or relating to its mass, or a combination thereof. Thus, in accordance with an aspect of this disclosure, the controller 32 may be programmed to make a logical decision regarding whether to adjust the mass of the fluid actuator 44 (at impact), or its velocity/acceleration (or other motion profile component). The decision may be a pre-set determination, or the controller 32 may utilize smart decision making (e.g., via a matrix of algorithms) regarding which option to use to reduce or otherwise control the impact force. This functions to dynamically change the impact force on the guest 16 so that the comfort of the guest 16 is maintained.

As an example of a pre-set determination, the controller 32 may be programmed to first reduce pressure of at least a portion of the fluid actuator 44 to reduce the impact force. Once the pressure is reduced to a threshold value (e.g., the minimum pressure required for structural integrity of the fluid actuator 44), the controller 32 may then switch to adjusting velocity/acceleration of the fluid actuator 44. As another example, a function of a certain parameter of the fluid actuator 44 (e.g., pressure, force, surface tension) as a function of time may be input into the pneumatic robotic system 10, and the function may dictate allowable changes made as a function of time. The controller 32 may then make adjustments to the fluid actuator 44 according to this function.

The controller 32 may also be programmed to adjust the impact force according to various standards to maintain compliance (e.g., according to a pass/fail or similar criterion) with various standards established for amusement park interactions. As an example, the controller 32 may monitor and perform real-time adjustments to the fluid actuator 44 to maintain compliance with established ASTM g-force loads that have been accepted for application on a human or guest 16, for example according to ASTM F-24-2291. As another example, the controller 32 may monitor and perform real-time adjustments to the fluid actuator 44 to maintain compliance with established standards for particular equipment, for instance a target object or for the materials of the attraction feature 22 itself. The values for F(total), F(max), and/or F(o) may be set based on such established standards.

Furthermore, in certain embodiments, the fluid actuator 44 may be monitored and controlled to maintain compliance with standards or some desired effect relating to interactions with other objects (e.g., amusement park equipment). For example, the fluid actuator 44 may have a motion path that causes it to impact a ride vehicle of the ride 18 (e.g., a part of a ride vehicle carrying guests 16), and the controller 32 may monitor and adjust aspects relating to the fluid actuator 44 of the attraction feature 22 to maintain the contact force to within a desired range. Again, the foregoing discussion may be applied to multiple fluid actuators 44, and their adjustments may be coordinated to obtain a programmed motion profile that is in accordance with a desired motion profile (e.g., an "ideal" motion profile).

Figure 4:
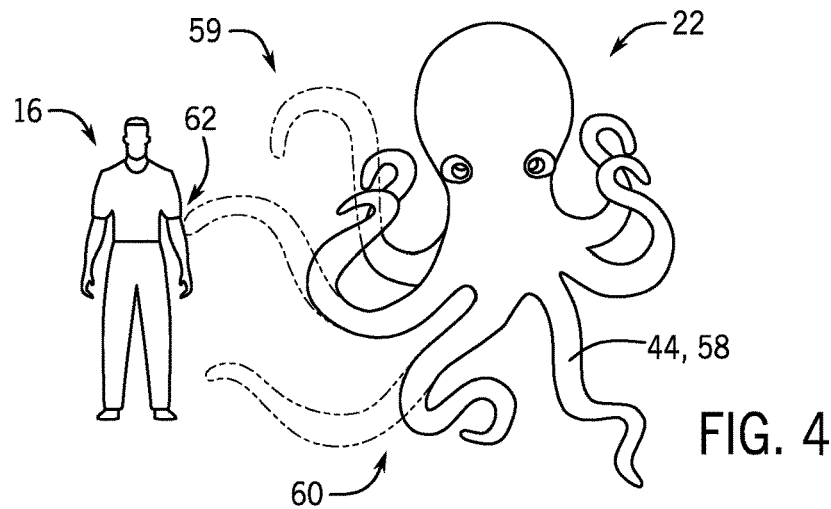
FIG. 4 is a schematic illustrating an example interaction experience between a target and an attraction feature of the pneumatic robotic system of FIG. 1, in accordance with present embodiments.
Figure 5:
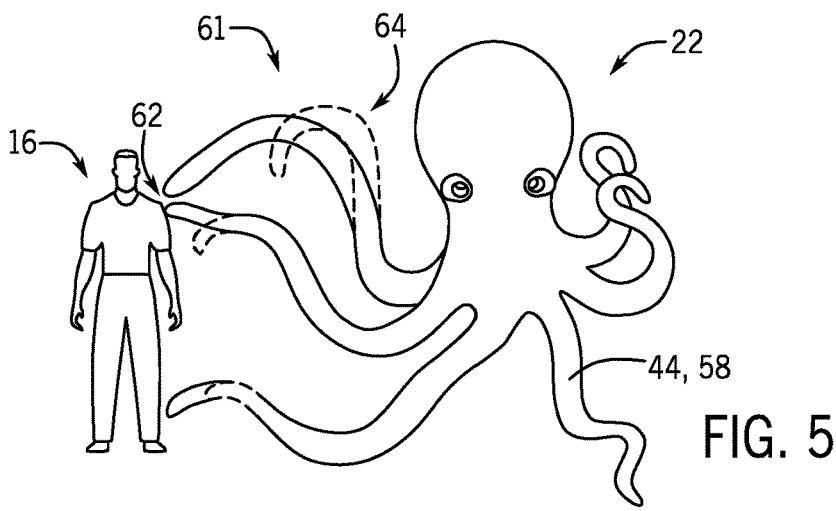
FIG. 5 is a schematic illustrating another example interaction experience between a target and an attraction feature of the pneumatic robotic system of FIG. 1, in accordance with present embodiments.
Figure 6:
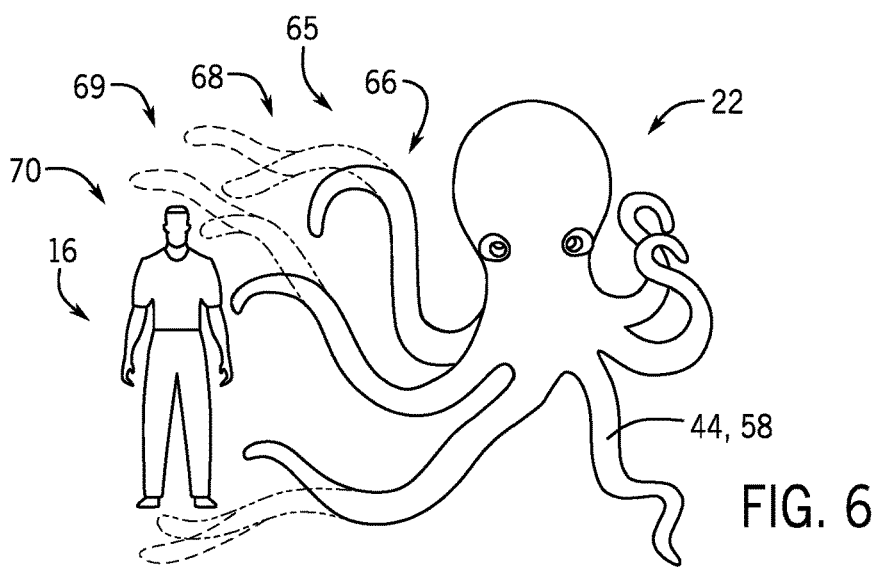
FIG. 6 is a schematic illustrating another example interaction experience between a target and an attraction feature of the pneumatic robotic system of FIG. 1, in accordance with present embodiments.

With the forgoing in mind, FIGS. 4, 5, and 6 show schematics illustrating example interactions of the attraction feature 22 with a target object, shown as one of the guests 16. However, other situations may include interactions with another object, such as another attraction feature 22, a portion of the attraction feature 22 itself, etc. In addition, for simplicity, the controller 32, fluid sources 46, control devices 48, sensors 42, and so forth, are not shown but it should be understood they are a part of the illustrated system.

In the illustrated embodiment in FIG. 4, the attraction feature 22 (e.g., illustrated as an octopus) may be controlled by the controller 32 to move according to a motion profile that can be adjusted in real-time. Here, the tentacles of the octopus may each correspond to one or more of the fluid actuators 44, and more specifically each fluid actuator may include an inflatable mass 58, which can be varied in shape based on a degree of inflation of the inflatable mass 58. The motion profile of the attraction feature 22 (and of individual fluid actuators 44) can also be varied by controlling inflation and deflation of the inflatable masses 58.

In FIG. 4, the attraction feature 22 has a first motion profile 59, such that at least a portion of the attraction feature 22 (here, several fluid actuators 44) may move from a first position 60 to a second position 62 toward the guest 16 to contact or touch the guest 16 at the second position 62. The controller 32 may be configured to control one or more interaction parameters exerted on guest 16, such that the one or more interaction parameters are within the respective suitable range while the attraction feature 22 maintains its desired shape. The one or more interaction parameters may include, but are not limited to, force, pressure, momentum, and compliance of the attraction feature 22 (e.g., compliance of one or more of the fluid actuators 44).

In the illustrated embodiment in FIG. 5, the attraction feature 22 may be controlled by the controller 32 to deflate upon contacting or touching the guest 16. The attraction feature 22 (e.g., one or more of the fluid actuators 44) may deflate, such that the one or more interaction parameters are within respective thresholds. For example, the attraction feature 22 may move according to a second motion profile 61, such that the attraction feature 22 moves from the first position 62 (e.g., the attraction feature 22 contacts the guest 16) to a third position 64 (e.g., the attraction feature 22 does not contact the guest 16). In certain embodiments, the attraction feature 22 may maintain contact with the guest 16 and/or maintain a desirable shape, but the attraction feature 22 may deflate such that the force, pressure, and/or momentum exerted on the guest 16 is at a desirable level (e.g., within desirable thresholds).

In the illustrated embodiment in FIG. 6, the attraction feature 22 may be controlled by the controller 32 to change motion profile before the attraction feature 22 contacts the guest 16 to avoid physical contact. For example, the attraction feature 22 may move according to a third motion profile 65 from a fourth position 66 (e.g., the attraction feature 22 does not contact the target 17) to a fifth position 68 toward the t guest 16, such that the attraction feature 22 is in close proximity to the guest 16 but does not contact the guest 16 at the fifth position 68. Subsequently, the attraction feature 22 may move according to a fourth motion profile 69 to move from the fifth position 68 to a sixth position 70. As the attraction feature 22 moves from the fifth position 68 to the sixth position 70, the attraction feature 22 moves to bypass or retract away from the guest 16 to avoid contacting the guest 16, or to control the impact forces imparted from the attraction feature 22 to the guest 16.

Figure 7:
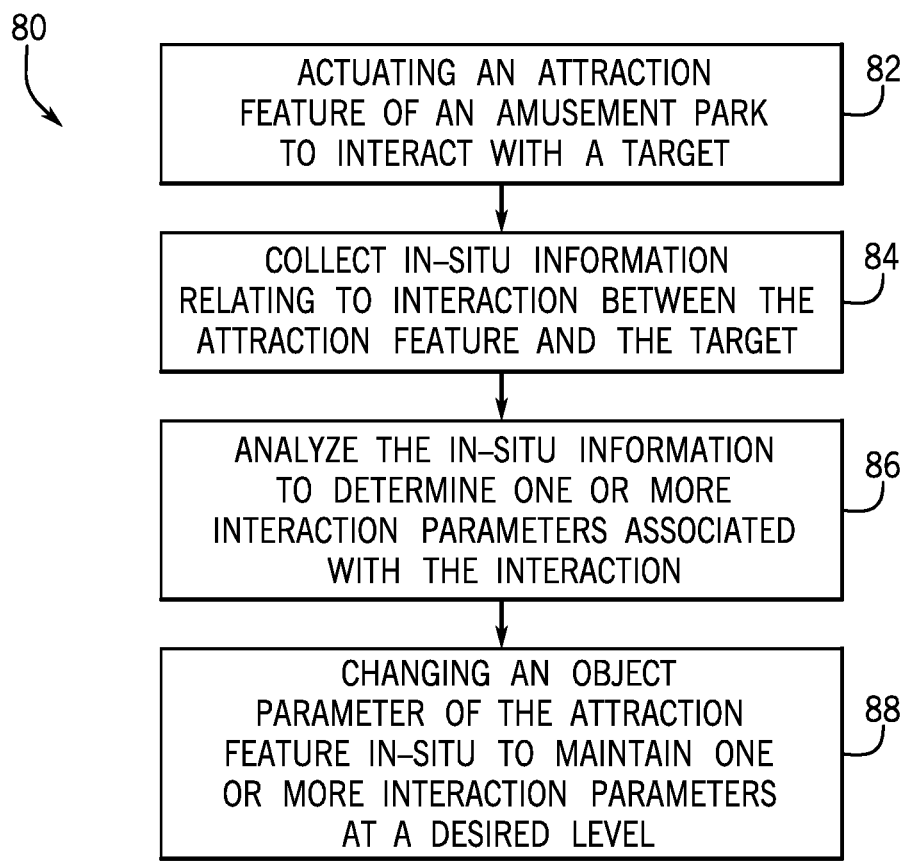
FIG. 7 is a flow diagram illustrating an embodiment of a process for operating the pneumatic robotic system of FIG. 1, in accordance with present embodiments.

FIG. 7 is a flow diagram of an embodiment of a process 80 to operate the attraction feature 22 (e.g., soft robot, machine) in accordance with present embodiments. The process 80 may be implemented by the pneumatic robotic system 10. The process 80 may be representative of initiated code or instructions stored in a non-transitory computer-readable medium (e.g., the memory 36) and executed, for example, by the processor 34. In other words, the process 80 is performed at least in part by the controller 32 according to the algorithmic structure described herein. An example of such algorithmic structure is described with respect to FIG. 7.

The process 80 may include actuating (block 82) the attraction feature 22 of the amusement park 12 to interact with a target (e.g., the guest 16). The target may be a guest in the amusement park 12, another attraction feature 22, the attraction feature 22 itself, other object(s) in the amusement park 12, or any suitable objects. Actuation of the attraction feature 22 may include controlled inflation of one or more of the fluid actuators 44 using, for example, control signals provided to the fluid source 46 and/or to one or more of the fluid control devices 54.

The process 80 may also include collecting (block 84) in-situ information relating to interaction between the attraction feature 22 (e.g., one or more of the fluid actuators 44) and the target. The in-situ information may include information (e.g., real-time feedback) collected by the one or more sensors 42 (e.g., force sensors, pressure sensors, cameras, fluid properties sensors, flow sensors).

The process 80 may also include analyzing (block 86) in-situ information to determine one or more interaction parameters associated with the interaction. By way of example, the one or more interaction parameters may include, but are not limited to, pressure, force, momentum, and compliance of the attraction feature 22 (e.g., one or more of the fluid actuators 44).

As set forth above, the motion profile and/or object dynamic properties of the fluid actuators 44 of the attraction feature 22 may be altered to control or adjust interactions between the attraction feature 22 and the target. Accordingly, the process 80 includes changing (block 88) one or more object parameters of the attraction feature 22. Such object parameters may specifically relate to the fluid actuators 44 of the attraction feature. For instance, changing the object parameters of the attraction feature 22 in accordance with the acts associated with block 88 may include changing the motion profile of the attraction feature 22 in-situ to maintain the one or more interaction parameters at a desired level. Additionally or alternatively, one or more object compliant properties may be adjusted in-situ to maintain the one or more interaction parameters at a desired level.

For example, the controller 32 may determine that the one or more interaction parameters exerted on the target are above or below a pre-determined threshold (e.g., not within a desired range), and in response to this determination, control the fluid flow to (or out of) one or more of the fluid actuators 44 (e.g., the inflatable mass of one or more of the fluid actuators 44) to adjust the object mass of the fluid actuators 44 to a pre-determined (e.g., target) range. Additionally or alternatively, the rate of inflation (or deflation) of the fluid actuators 44, the relative timing of inflation (or deflation) of different fluid actuators 44, or a combination, may be adjusted to modify the motion profile of the attraction feature 22.

Thus, the fluid flow into and out of the fluid actuators 44 may be increased or decreased at a rate determined by the controller (e.g., the controller 32 or the control device 48) to maintain or move the one or more interaction parameters to within the target range.

Other effects may also be coordinated by the ride show supervisor 40 and the controller 32, for example to coordinate ride movement, lighting effects, sound effects, and so forth, with control of the attraction feature 22. For instance, pre-programmed sound and/or light effects may be triggered in response to the attraction feature 22 moving to a respective position and/or moving according to a particular motion profile, with different lighting and sound effects being provided for different motion profiles.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. An amusement park attraction, comprising:
   an attraction feature comprising a fluid actuator having an inflatable mass, the inflatable mass being fluidly connected to a source of pressurized fluid to enable inflation of the inflatable mass;

one or more fluid control devices configured to adjust inflation of the inflatable mass;
one or more sensors configured to monitor state properties of the fluid actuator; and
a controller communicatively coupled to the one or more fluid control devices and the one or more sensors, wherein the controller comprises instructions that when executed are configured to:
controllably inflate the inflatable mass based at least on feedback from the one or more sensors to cause the fluid actuator to impact an object:
calculate an impact force exerted by the fluid actuator on the object based at least on feedback from the one or more sensors;
determine if the impact force is within a predetermined range; and
control the inflation of the inflatable mass to adjust one or more parameters of the fluid actuator to maintain the impact force exerted by the fluid actuator on the object to within the predetermined range.

2. The amusement park attraction of claim 1, wherein the instructions are configured to calculate a maximum impact force (F(max)) of the fluid actuator against the object using the feedback from the one or more sensors, and to adjust the parameters of the fluid actuator so that the calculated F(max) is below a threshold in real-time.

3. The amusement park attraction of claim 1, wherein the instructions are configured to adjust operation of the one or more fluid control devices to maintain the one or more parameters exerted by the fluid actuator on the object to within the predetermined range in real-time.

4. The amusement park attraction of claim 3, wherein the one or more parameters of the fluid actuator comprise internal pressure, momentum, velocity, acceleration, mass, compliance, or any combination thereof, of the fluid actuator.

5. The amusement park attraction of claim 1, comprising a sound system, a light system, or both, and the instructions are configured to adjust operation of the sound system, the light system, or both, in concert with controlled inflation or deflation of the inflatable mass.

6. The amusement park attraction of claim 1, wherein the one or more sensors comprise a force sensor, a pressure sensor, a camera, a fluid property sensor, or any combination thereof.

7. The amusement park attraction of claim 1, wherein the controller is communicatively coupled to a ride vehicle of an amusement park, and wherein the instructions are configured to controllably inflate or deflate the inflatable mass based at least on operation of the ride vehicle to cause the attraction feature to impact a human guest on the ride vehicle, or to impact a part of the ride vehicle.

8. The amusement park attraction of claim 1, wherein the attraction feature comprises a plurality of fluid actuators, and wherein the plurality of fluid actuators is arranged in a pattern that defines a shape of the attraction feature.

9. The amusement park attraction of claim 1, wherein the instructions are configured to control the inflation of the inflatable mass to adjust a motion profile of the fluid actuator to maintain the impact force exerted by the fluid actuator on the object to within the predetermined range.

10. The amusement park attraction of claim 1, wherein the instructions are configured to control the inflation of the inflatable mass to adjust one or more object compliant properties of the fluid actuator to maintain the force exerted by the fluid actuator on the object to within the predetermined range.

11. The amusement park attraction of claim 1, wherein the instructions are configured to select either or both of controlling inflation of the inflatable mass to adjust one or more object compliant properties of the fluid actuator or controlling a motion profile of the fluid actuator to maintain the force exerted by the fluid actuator on the object to within the predetermined range.

12. A method of operating an attraction feature of an amusement park, comprising:
inflating a fluid actuator of the attraction feature to move the attraction feature along a motion profile to cause an interaction between the attraction feature and a target, the interaction comprising physical contact between the attraction feature and the target;
collecting information relating to the interaction between the attraction feature and the target using one or more sensors as the interaction is occurring;
analyzing, via a controller in communication with the one or more sensors, the collected information from the one or more sensors to determine an interaction parameter associated with the interaction; and
adjusting inflation of the fluid actuator as the interaction is occurring to maintain the interaction parameter within a target range.

13. The method of claim 12, wherein the interaction comprises physical contact between the fluid actuator of the attraction feature and the target, and wherein analyzing the collected information comprises continuously calculating a maximum impact force (F(max)) of the fluid actuator against the target using the collected information, and wherein adjusting inflation of the fluid actuator comprises inflating or deflating the fluid actuator to adjust an object compliant property of the fluid actuator.

14. The method of claim 12, wherein adjusting inflation of the fluid actuator comprises inflating or deflating the fluid actuator to adjust the motion profile of the attraction feature.

15. The method of claim 14, wherein adjustment of the motion profile causes at least a portion of the attraction feature to move away from the target.

16. A pneumatic robotic system, comprising:
an attraction feature comprising a plurality of fluid actuators configured to provide a shape and a motion profile of the attraction feature in response to controlled inflation;
a fluid source fluidly coupled to the attraction feature and configured to provide pressurized fluid to the plurality of fluid actuators;
one or more fluid control devices configured to control pressurized fluid flow from the fluid source to the plurality of fluid actuators;
one or more sensors associated with the attraction feature and configured to monitor state properties of the plurality of fluid actuators; and
a controller communicatively coupled to the one or more fluid control devices and to the one or more sensors, wherein the controller comprises instructions that when executed are configured to:
analyze feedback from the one or more sensors relating to an interaction between the attraction feature and a target as the interaction is occurring to determine one or more interaction parameters associated with the interaction, wherein the interaction between the attraction feature and the target comprises physical contact between the attraction feature and the target; and
adjust inflation of at least one fluid actuator of the plurality of fluid actuators to maintain the one or more interaction parameters within a predetermined range as the interaction is occurring.

17. The pneumatic robotic system of claim 16, wherein the instructions are configured to determine the one or more interaction parameters by continuously calculating a maximum impact force (F(max)) of the attraction feature against the target, and wherein the controller is configured to adjust inflation of at least one fluid actuator of the plurality of fluid actuators to adjust the motion profile of the attraction feature, or is configured to inflate or deflate at least one fluid actuator of the plurality of fluid actuators to adjust an object compliant property of the fluid actuator, or both, to maintain the one or more interaction parameters within the predetermined range as the interaction is occurring.

18. The pneumatic robotic system of claim 17, wherein the instructions are configured to control flow of the pressurized fluid to the plurality of fluid actuators to adjust a pressure difference across at least one fluid actuator of the plurality of fluid actuators or an average internal pressure of at least one fluid actuator of the plurality of fluid actuators.

19. The pneumatic robotic system of claim 16, wherein the one or more sensors comprise a force sensor, a pressure sensor, a camera, a fluid property sensor, or any combination thereof.

20. The pneumatic robotic system of claim 16, comprising a sound system, a light system, or both, and wherein the controller is configured to control operation of the sound system, the light system, or both, based on the motion profile of the attraction feature.

* * * * *